Feb. 4, 1930.                    W. O. HUNTER                    1,745,695
                                ANTIGLARE DEVICE
                               Filed Oct. 5, 1926
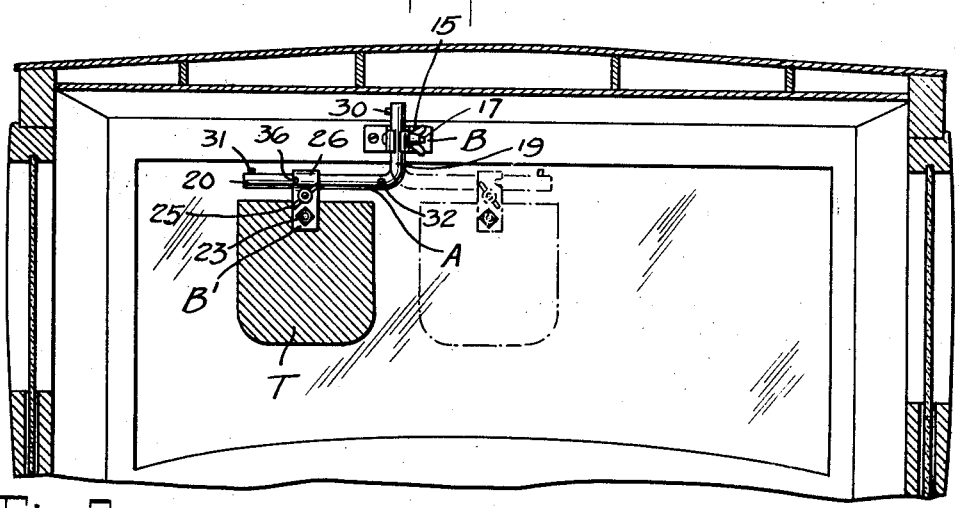
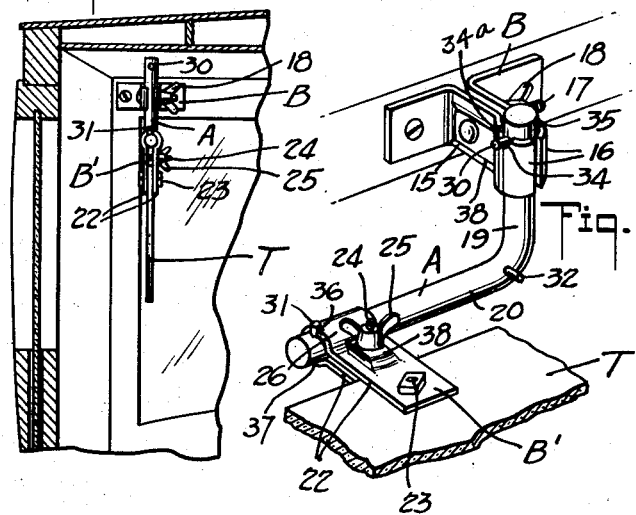
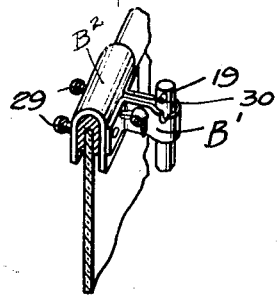
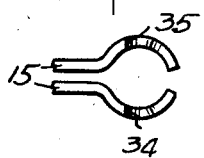
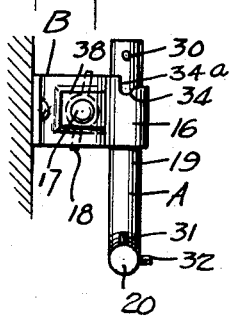
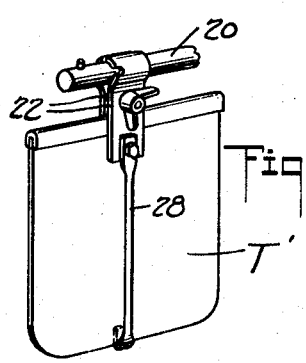
INVENTOR
WILLIAM O. HUNTER
BY
ATTORNEY Patented Feb. 4, 1930

1,745,695

UNITED STATES PATENT OFFICE

WILLIAM O. HUNTER, OF RIVERSIDE, CALIFORNIA

ANTIGLARE DEVICE

Application filed October 5, 1926. Serial No. 139,706.

My invention relates to anti-glare attachments for the windshields of motor vehicles to protect the motorist at night against the glare of lights of approaching vehicles and in the day against the glare of the sun.

It is a purpose of my invention to provide an attachment of the above described character which, in addition to possessing the desirable qualities of structural simplicity and durability and low cost of manufacture, is readily applicable to automobiles of the closed or open type, and when in applied position can be operated to secure any one of a multiplicity of adjustments to suit any condition whereby the attachment is caused to properly and effectively intercept glare producing lights and thereby protect the motorist against glare, yet permittting him to have unobstructed vision of the roadway in advance of the vehicle.

I will describe only one form of anti-glare device embodying my invention and will then point out the novel features thereof in claims.

In the accompanying drawings,

Figure 1 is a view showing in transverse section the body of an automobile of the closed type, having applied thereto one form of anti-glare device embodying my invention;

Figure 2 is a fragmentary section of an automobile body showing another application of the anti-glare device shown in Figure 1;

Figure 3 is an enlarged view showing in perspective the device shown in Figure 1 and another adjustment of the transparent member;

Figure 4 is a view showing the device in end elevation with the screen supporting bracket removed;

Figure 5 is a sectional perspective view showing my invention applied to the windshield of an open car body;

Figure 6 is a perspective view showing a modified form of transparent member embodying my invention;

Figure 7 is a fragmentary plan view of one of the brackets embodied in the device.

Similar reference characters refer to similar parts in each of the several views.

Referring specifically to the drawings, my invention, in the embodiment shown in Figures 1 and 2, comprises a bracket designated at B, which is adapted to be secured to the upper portion of a windshield frame of a closed automobile body, as clearly illustrated in Figure 1, to support the anti-glare device as a whole at the inner side of the windshield. This bracket B comprises two substantially L-shaped plates 15 having curved jaws 16 adapted to be secured in clamping relation to an arm designated generally at A, and by means of a bolt 17 carrying a wing nut 18.

The arm A is constructed of metal, or other suitable material, and is substantially L-shaped in form to provide a short arm 19 and a long arm 20, the short arm being received between the jaws 16 and clampingly engaged thereby when desired to support the arm against movement, and through the medium of such bracket the arm A is thus supported with the portion 20 disposed horizontally and the portion 19 vertically.

T designates a non-glare screen, which, in the present instance, is a plate of transparent or translucent glass of suitable configuration colored so as to render it glare-intercepting. It is to be understood, however, that the screen may be formed of any suitable material which will act as a shield when located in a position to protect the eyes of the driver from light glare. This screen T is mounted on the portion 20 of the arm A by bracket B', the latter consisting of two plates 22 secured to the screen by a bolt 23, and provided with a second bolt 24 carrying a wing nut 25 by which the curved jaws 26 of the bracket can be adjusted to clampingly or loosely embrace the portion 20.

The plates 15 and 22 of the brackets B and

B' are formed with raised portions 38 through which the bolts 17 and 24 extend, such raised portions serving to stiffen the plates around thee bolt receiving openings and form shoulders against which the bolt head and nut abut.

In order that the various adjustments of the screen may be obtained and maintained with security and dispatch, the arm is provided with lugs or pins 30, 31 and 32 positioned as shown and adapted to coact with notches 34 to 37, inclusive, formed in the jaws 16 and 26 of the brackets B and B', respectively.

With the parts of the device assembled, as illustrated in Figures 1 and 3, the jaws of the bracket B can be adjusted to firmly clamp the arm portion 19 so that the arm as a whole is secured against vertical or turning movement. Thus a positive adjustment of the arm A to effect a vertical or a horizontal adjustment of the portion 20 can be effected. Should the jaws be adjusted to just loosely embrace the arm the portion 19 is held against pulling from the bracket by the pin 30 abutting the upper edge of either jaw. Further, pin 30 engages within either 34 or 35, as illustrated in Figure 3, to secure the arm against rotative movement while in its lowered position and in either of two extreme positions, as will be clear from a consideration of the location of the notches, the portion 20 of the arm being parallel to the windshield in either of its positions. It will be understood that the portion 19 can be frictionally retained in the elevated position shown in Figure 1 in which the pin 30 is clear of the bracket, so that the arm can be rotated to any position desired and frictionally held in such position, thus permitting the arm to be swung without stopping to adjust the jaws. It can also be retained in a position between the positions shown in Figs. 1 and 3 wherein the pin 30 will not seat in either notch but will engage the rear wall of the notch which it will be noted rises above the upper edge of the jaws proper to form a shoulder 34ª. Thus the arm is limited in its swinging movement in either direction by the pin and shoulders and to the extent of preventing the horizontal arm portion 20 from striking and possibly breaking the windshield.

The bracket B', together with the screen T, is adjustable longitudinally on the arm portion 20, and such adjustment may be maintained by adjusting the jaws 26 to firmly clamp the arm. If it is desired to elevate the screen to a horizontal position as shown in Figure 2, the bracket jaws when loosened permit the bracket to be elevated and then moved lengthwise on the arm to cause the pin 31 to engage within the recess 36 when the bracket and screen will be retained in horizontal position when released. If it is desired to support the screen in horizontal position at the other end of the arm, the bracket is manipulated to position the pin 32 between the jaws, thus causing the two to co-act in maintaining the screen in horizontal position. It is also possible to support the screen in upright position above the arm portion 20 by elevating the bracket to cause the pin 31 to be positioned between the jaws.

An anti-glare device constructed in accordance with my invention as just described allows vertical adjustment of the arm A on the bracket B, as well as a horizontal adjustment of the arm to vary the position of the portion 20, the screen being adjusted accordingly. Further, the screen can be adjusted longitudinally on the portion 20 or vertically thereon so as to permit of its being moved to an out of the way position or to any intermediate position in order that the screen may be interposed in the line of vision of the driver to intercept light rays. The L-shaped arm may be reversed, the longer part being inserted in bracket B and the shorter arm carrying the screen. Also the entire device may be attached at one end of the windshield frame, as illustrated in Figure 2, and in the adjustment shown of the screen it functions to intercept the sun's rays from the side and in relation to the eyes of the driver of the car. It will, of course, be understood that normally the screen is positioned directly in front of the eyes of the driver to shield him against the lights of approaching vehicles.

In any adjustment of the arm or screen the brackets serve to retain them against movement frictionally in one instance and positively through the pins and recesses in the other, and all without a new adjustment of the nuts for each position, as will be understood. This device can be mounted and adjusted so as not to interefere with windshield wipers, ventilating devices or mirrors which may be also mounted on the windshield frame.

In Figure 6 I have shown another form of screen designated at T' and which consists of a sheet of flexible material such as colored celluloid. The upper edge of this sheet is braced by a U-shaped bead formed of metal or other suitable material and adapted to be clamped between the plates 22 of the bracket B'. A rod 28 is bolted to the bracket B' so as to extend downwardly on one side to the member T', and one end of the rod is flattened and bent upon itself so as to embrace the edge of the sheet. In this manner the rod 28 serves to reinforce the flexible sheet against flapping.

In Figure 5 I have shown the bracket B' applied to the upper edge of a windshield frame for open cars. In this adaptation of my invention the bracket is secured to an auxiliary bracket B² which, as shown, is of U form and embraces the upper edge of the frame and is provided with a pair of set screws 29 for locking the bracket to the frame. It will thus be seen that my device is capable of being applied to the windshields of automobiles of both the closed and open types, and in either adaptation it is capable of various adjustments to position the screen as desired to intercept light rays and thus protect the operator of the vehicle against glare.

Although I have herein shown and described only one form of anti-glare device embodying my invention, it is to be understood that various changes and modifications may be made therein without departing from the spirit of the invention and the spirit and scope of the appended claims.

I claim as my invention:

1. An anti-glare device comprising a clamping bracket having adjustable jaws formed with notches, an L-shaped arm having one portion mounted in the bracket between the jaws and rotatable in one adjustment of the jaws, a pin on the said portion of the arm adapted to engage within any one of the notches of the jaws to releasably secure the arm against rotation and in different positions of adjustment and to secure the arm against accidental removal from the bracket, a second clamping bracket having adjustable jaws formed with notches and embracing the other portion of the arm, pins on the last portion of the arm circumferentially and longitudinally spaced and adapted to engage within the notches of the jaws of the second bracket to releasably secure the bracket in various positions of adjustment, and a light screen secured to the second bracket.

2. An anti-glare device comprising a clamping bracket having curved and adjustable jaws with a pair of notches in the upper edges thereof and upstanding shoulders at the rear of the notches, a light screen carrying arm having a vertical portion mounted between the jaws and rotatable in one adjustment of the jaws, and a pin on said vertical portion above the jaws to engage within either notch when the jaws are adjusted sufficiently loose to permit vertical movement of said portion and to abut either of said shoulders when the jaws are adjusted to permit rotation only of the vertical portion whereby its movement in either direction is limited.

3. An anti-glare device as embodied in claim 2 wherein the arm has a horizontal portion of different length than that of the vertical portion, a pin on said horizontal portion, the jaws of said bracket adapted to receive the horizontal portion of the arm so that the respective pin functions the same as the first pin.

4. An anti-glare device comprising a clamping bracket having adjustable jaws formed with notches, an arm mounted in the bracket between the jaws so as to be slidable lengthwise and rotatable in one position of adjustment of the jaws and fixed against movement in another position of adjustment of the jaws, a pin on the arm engageable within any one of the notches for securing the arm against rotation in the bracket when the jaws are adjusted to permit rotation and to secure the arm against displacement from the bracket lengthwise in one direction, and a light screen on the arm.

WILLIAM O. HUNTER.